US012801601B2

(12) United States Patent
Yazdan Panah Gohar Rizi et al.

(10) Patent No.: US 12,801,601 B2
(45) Date of Patent: Nov. 17, 2026

(54) COMPUTING SYSTEM AND METHOD FOR QUESTION ANSWERING USING AN ARCHITECTURE OF ARTIFICIAL INTELLIGENCE AGENTS

(71) Applicant: Procore Technologies, Inc., Carpinteria, CA (US)

(72) Inventors: Azadeh Yazdan Panah Gohar Rizi, Richmond Hill (CA); Mohammad Mostafa Soltani, Toronto (CA)

(73) Assignee: Procore Technologies, Inc., Carpinteria, CA (US)

( * ) Notice: Subject to any disclaimer, the term of this patent is extended or adjusted under 35 U.S.C. 154(b) by 0 days.

(21) Appl. No.: 18/948,008

(22) Filed: Nov. 14, 2024

(65) Prior Publication Data

US 2026/0133965 A1 May 14, 2026

(51) Int. Cl.
*G06F 30/13* (2020.01)
*G06F 16/2453* (2019.01)

(52) U.S. Cl.
CPC .............................. *G06F 16/24535* (2019.01)

(58) Field of Classification Search
None
See application file for complete search history.

(56) References Cited

U.S. PATENT DOCUMENTS

| | | | | |
|---|---|---|---|---|
| 11,016,972 | B2 * | 5/2021 | Tiyyagura | G06F 16/24535 |
| 2011/0082859 | A1 | 4/2011 | Deng et al. | |
| 2019/0236185 | A1 * | 8/2019 | Tiyyagura | G06F 16/24532 |
| 2020/0272664 | A1 * | 8/2020 | Aggour | G06F 16/2471 |
| 2020/0342018 | A1 | 10/2020 | Lange et al. | |
| 2021/0342710 | A1 * | 11/2021 | Cornelio | G06F 16/2246 |
| 2022/0107940 | A1 * | 4/2022 | Ganser | G06F 3/0482 |
| 2022/0253442 | A1 * | 8/2022 | Singh | G06F 3/0486 |
| 2023/0244938 | A1 | 8/2023 | Wei et al. | |
| 2025/0053857 | A1 * | 2/2025 | Thramann | G06N 20/00 |

FOREIGN PATENT DOCUMENTS

WO 2021184572 A1 9/2021

OTHER PUBLICATIONS

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

International Searching Authority, PCT International Search Report and Written Opinion, PCT International Application No. PCT/US2025/055285, Mar. 23, 2026, 9 pages.

* cited by examiner

*Primary Examiner* — Thu N Nguyen
(74) *Attorney, Agent, or Firm* — Lee Sullivan Shea & Smith LLP

(57) ABSTRACT

Disclosed herein is a computing platform configured to: (i) receive a user query, (ii) provide the user query to a first AI agent that (a) utilizes a first AI model to decompose the user query into a set of sub-queries, and (b) for each respective sub-query in the set, searches for and retrieves a respective subset of one or more digital data objects, (iii) provide a first subset of the set of sub-queries to a second AI agent configured to answer a first type of sub-query, (iv) provide a second subset of the set of sub-queries to a third AI agent configured to answer a second type of sub-query, (v) provide the respective answers to the sub-queries in the first and second subsets to a fourth AI agent that is configured to compose a final answer to the user query, and (vi) cause the final answer to be presented.

20 Claims, 6 Drawing Sheets

COMPUTING SYSTEM AND METHOD FOR QUESTION ANSWERING USING AN ARCHITECTURE OF ARTIFICIAL INTELLIGENCE AGENTS

BACKGROUND

Construction projects are often complex endeavors involving the coordination of many professionals across several discrete phases. Because of this, parties involved in construction projects have increasingly begun to use software applications to manage those construction projects. One example of such a software application is the software-as-a-service (SaaS) application for construction management offered by Procore Technologies, Inc. ("Procore"), who is the current applicant. Using construction management software applications such as these, parties can create a digital representation of a given construction project that is to be managed and then create, store, view, and/or interact with various types of digital data objects associated with the given construction project. Such digital data objects may take various forms, examples of which may include schedules, daily logs, images, drawings, specifications, correspondence, building information models (BIMs), sensor data, budgets, change orders, communications, invoices, directories, punch lists (e.g., which list work that has not yet been completed or has been completed incorrectly), timesheets, requests for information (RFIs), submittals, and/or reports, among other types of information, among many other examples of digital data that may be stored for a construction project.

SUMMARY

Disclosed herein is a new software technology for answering questions related to a construction project using Artificial Intelligence (AI).

In one aspect, the disclosed technology may take the form of a method that involves (i) receiving a user query related to a construction project, (ii) providing the user query to a first artificial intelligence (AI) agent that (a) utilizes a first AI model to decompose the user query into a set of sub-queries, and (b) for each respective sub-query in the set, searches for and retrieves a respective subset of one or more digital data objects for the respective sub-query in the set, (iii) providing a first subset of the set of sub-queries to a second AI agent that is configured to answer a first type of sub-query, wherein the second AI agent utilizes a second AI model to determine a respective answer for each respective sub-query in the first subset based on a respective subset of one or more digital data objects that are retrieved for the respective sub-query, (iv) providing a second subset of the set of sub-queries to a third AI agent that is configured to answer a second type of sub-query, wherein the third AI agent utilizes a third AI model to determine a respective answer for each respective sub-query in the second subset based on a respective subset of one or more digital data objects that are retrieved for the respective sub-query, (v) providing the respective answers to the sub-queries in the first and second subsets to a fourth AI agent that is configured to compose a final answer to the user query, and (vi) causing the final answer for the user query to be presented.

In some implementations, the first type of sub-query may not require knowledge of named entities and the second type of sub-query may require knowledge of named entities. In such implementations, the method may further involve, for each respective sub-query in the set, determining whether the respective sub-query is the first type of sub-query or the second type of sub-query. Based on the determination that the respective sub-query is the first type of sub-query, the method may also involve providing the respective sub-query to the second AI agent as part of the first subset of the set of sub-queries. Based on the determination that the respective sub-query in the set is the second type of sub-query, the method may involve providing the respective sub-query to the third AI agent as part of the second subset of the set of sub-queries.

In some implementations, the named entities may comprise one or more of names of individuals, names of parties, locations, addresses, events, or types of digital data object.

Further, in some implementations, each respective subset of one or more digital data objects may comprise one or more schedules, daily logs, images, drawings, specifications, correspondence, building information models (BIMs), sensor data, budgets, change orders, communications, invoices, directories, punch lists, timesheets, requests for information (RFIs), submittals, or reports.

Further yet, in some implementations, decomposing the user query into the set of sub-queries comprises decomposing the user query into the set of sub-queries using a chain-of-thought reasoning technique.

In some implementations, searching for the respective subset of one or more digital data objects for each respective sub-query in the set comprises searching for the respective subset of one or more digital data objects using a semantic search technique.

Further yet, in some implementations, the second AI model may comprise a pre-trained generative AI model and the third AI model may comprise a fine-tuned generative AI model.

In another aspect, the disclosed technology may take the form of a computing platform comprising at least one processor, at least one non-transitory computer-readable medium, and program instructions stored on the at least one non-transitory computer-readable medium that are executable by the at least one processor such that the computing platform is configured to carry out the functions of the aforementioned method.

In yet another aspect, the disclosed technology may take the form of a non-transitory computer-readable medium comprising program instructions stored thereon that are executable by at least one processor to cause a computing platform to carry out the functions of the aforementioned method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

Figure 1:
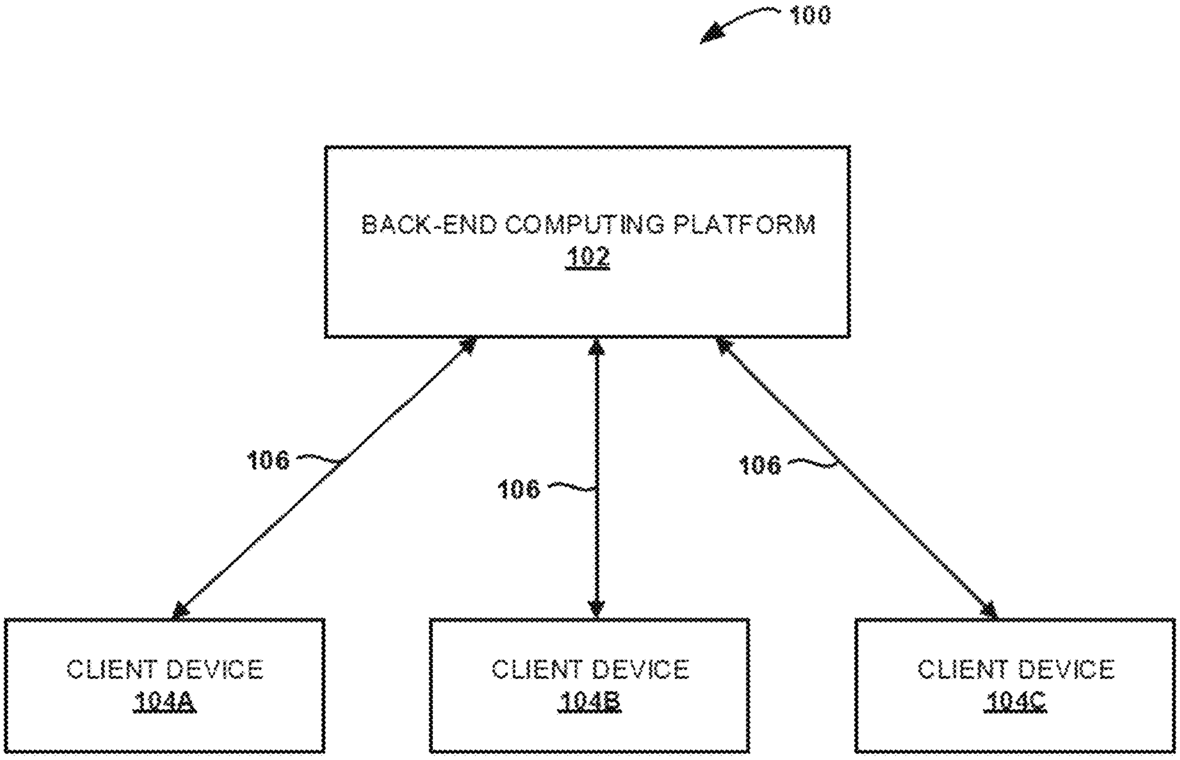
FIG. 1 depicts an example network configuration in which example embodiments may be implemented.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

The following disclosure refers to the accompanying figures and several examples. One of ordinary skill in the art would understand that such references are for the purpose of explanation only and are therefore not meant to be limiting. Part or all of the disclosed systems, devices, and methods may be rearranged, combined, added to, and/or removed in a variety of manners, each of which is contemplated herein.

As noted above, construction management today is often performed through the use of software applications, such as the software application for construction management provided by Procore Technologies, Inc.®, the applicant of the present disclosure. These software applications generally provide users with the ability to create, store, view, and/or interact with various types of digital data related to a construction project, such as schedules, daily logs, images, drawings, specifications, correspondence, building information models (BIMs), sensor data, budgets, change orders, communications, invoices, directories, punch lists (e.g., which list work that has not yet been completed or has been completed incorrectly), timesheets, requests for information (RFIs), submittals, and/or reports, among many other examples of digital data that may be stored for a construction project. In practice, these construction management software applications may take various forms.

As one possible implementation, a construction management software application may include both front-end software (e.g., a web application, desktop application, or mobile application) running on client devices that are accessible to individuals associated with construction projects (e.g., contractors, project managers, architects, engineers, designers, etc.) and back-end software running on a back-end computing platform (sometimes referred to as a "cloud" platform) that interacts with and/or drives the front-end software, and which may be operated (either directly or indirectly) by the provider of the front-end software. This form of a software application may be referred to as a client-server application or a software-as-a-service (Saas) application, among other possibilities. As another possible implementation, a construction management software application may include front-end software that runs on client devices without interaction with a back-end computing platform. These construction management software applications may take other forms as well.

Turning now to the figures, FIG. 1 depicts an example network environment 100 in which a construction management software application may be implemented. As shown in FIG. 1, the network environment 100 includes a back-end computing platform 102 that may be communicatively coupled to one or more client devices 104, which as shown includes the client device 104A, the client device 104B, and the client device 104C. Although the client devices 104 are depicted by three devices as shown for the sake of simplicity in illustration, it should be understood that the client devices 104 may represent more or less than three devices without departing from the spirit and scope of this disclosure.

Broadly speaking, the back-end computing platform 102 may comprise one or more computing systems that have been provisioned with back-end software for a construction management software application, which may include program code for carrying out one or more of the platform-side functions disclosed herein. The one or more computing systems of back-end computing platform 102 may collectively comprise some set of physical computing resources (e.g., one or more processors, data storage system, communication interfaces, etc.), which may take various forms and be arranged in various manners.

For instance, as one possibility, the back-end computing platform 102 may comprise computing infrastructure of a public, private, and/or hybrid cloud (e.g., computing and/or storage clusters) that has been provisioned with back-end software for the construction management software application. In this respect, the entity that owns and operates the back-end computing platform 102 may supply its own cloud infrastructure or obtain the cloud infrastructure from a third-party provider of "on demand" computing resources, such as Amazon Web Services (AWS) or the like. As another possibility, the back-end computing platform 102 may comprise one or more dedicated servers that have been provisioned with back-end software for the construction management software application.

Further, in practice, the back-end software installed at the back-end computing platform 102 may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

Further yet, although not shown in FIG. 1, the back-end software installed at the back-end computing platform 102 may interact with a data storage layer of the back-end computing platform 102, which may comprise data stores of various different forms, examples of which may include relational databases (e.g., Online Transactional Processing (OLTP) databases), NoSQL databases (e.g., columnar databases, document databases, key-value databases, graph databases, etc.), file-based data stores (e.g., Hadoop Distributed File System), object-based data stores (e.g., Amazon S3), data warehouses (which could be based on one or more of the foregoing types of data stores), data lakes (which could be based on one or more of the foregoing types of data stores), message queues, or streaming event queues, among other possibilities.

The back-end computing platform 102 may comprise various other components and take various other forms as well.

In turn, the client devices 104 may each be any computing device that is capable of running front-end software of the construction management software application, which may include program code for carrying out the client-side functions disclosed herein. In this respect, the client devices 104 may each include hardware components such as one or more processors, computer-readable mediums, communication interfaces, and input/output (I/O) components (or interfaces for connecting thereto), among others, as well as software components that facilitate the client device's ability to run the front-end software (e.g., operating system software, web browser software, etc.). As representative examples, the client devices 104 may each take the form of a desktop computer, a spatial computer, a laptop, a netbook, a tablet, a smartphone, and/or a personal digital assistant (PDA), among other possibilities.

As further depicted in FIG. 1, the back-end computing platform 102 is configured to interact with the client devices 104 over respective communication paths 106. In this respect, each communication path 106 between the back-end computing platform 102 and one of the client devices 104 may generally comprise one or more communication networks and/or communications links, which may take any of various forms. For instance, each respective communication path 106 with the back-end computing platform 102 may include any one or more of Personal Area Networks (PANs), Local-Area Networks (LANs), Wide-Area Networks (WANs) such as the Internet or cellular networks, cloud networks, and/or point-to-point links, among other possibilities. Further, the communication networks and/or links that make up each respective communication path 106 with the back-end computing platform 102 may be wireless, wired, or some combination thereof, and may carry data according to any of various different communication protocols. Further yet, communications over each respective communication path 106 could be carried out via an Application Programming Interface (API), among other possibilities. Still further, although not shown, the respective communication paths 106 between the client devices 104 and the back-end computing platform 102 may also include one or more intermediate systems. For example, it is possible that the back-end computing platform 102 may communicate with a given client device 104 via one or more intermediary systems, such as a host server (not shown). Many other environments are also possible.

Although not shown in FIG. 1, the back-end computing platform 102 may also be configured to receive data, such as data related to a construction project, from one or more external data sources, such as an external database and/or another back-end computing platform or platforms. Such data sources—and the data output by such data sources—may take various forms.

It should be understood that the network environment 100 depicted in FIG. 1 is one example of a network environment in a construction management software application may be implemented. Numerous other arrangements are possible and contemplated herein. For instance, other network configurations may include additional components not pictured and/or more or fewer of the pictured components.

In operation, existing construction management software applications may enable a representative of a given party that wishes to utilize a construction management software application to (i) create an account with the construction management software application and (ii) add a set of individuals associated with the given party as users on the given party's account. After the given party's account is created and a set of users have been added, the construction management software application may thereafter enable the representative of the given party (or some other representative that has been added to the account as a user having the requisite permissions) to (i) create a respective project workspace for each of one or more construction projects that involve the given party and (ii) for each such construction project, designate a respective subset of the given party's users that are allowed to access data associated with the respective project workspace. In this respect, the given party may be considered to be the "owner" of the project workspace(s) and the data contained therein.

As noted above, existing construction management software applications may enable users to electronically manage construction projects, which may involve software features for creating, storing, viewing, and/or interacting with any of various types of digital data objects associated with a given construction project, including but not limited to any of the various types of digital data objects discussed above (e.g., schedules, daily logs, images, drawings, specifications, correspondence, BIMs, sensor data, budgets, change orders, communications, invoices, directories, punch lists, timesheets, RFIs, submittals, reports, etc.). In practice, each different type of data object that is supported by a construction management software application may be designed to serve a particular purpose within the construction management software application and may comprise a particular set of data elements that facilitate that particular purpose. For instance, a first type of data object may be designed to serve a first purpose within the construction management software application and may comprise a first set of data elements, a second type of project-related data object may be designed to serve a second purpose within the construction management software application and may comprise a second set of data elements that differs from the first set of data elements, and so on for each of the other types of data objects. In this way, the users of the construction management software application may utilize different types of data objects to manage different aspects of the construction project.

Further, in at least some implementations, the software features for creating, storing, viewing, and/or interacting with the various types of data objects may be arranged into different software "tools" that each correspond to a different type of data object. For instance, a construction management software application may include an "RFIs" tool for creating, storing, viewing, and/or interacting with RFI digital data objects, a "Daily Log" tool for creating, storing, viewing, and/or interacting with Daily Log digital data objects, and so on. In other implementations, the software features for creating, storing, viewing, and/or interacting with the various types of data objects may be arranged in other manners that are not based on software tools paradigm.

In practice, there will typically be a large volume of different digital data objects that are created and stored for a construction project, including digital data objects of various different types that are created by various different individuals across various different phases of the construction project (e.g., planning/design, pre-construction, procurement, construction, post-construction, etc.), and those digital data objects (along with the corresponding software tools for accessing such data objects) may be utilized to perform any of various tasks related to the construction project, including but not limited to answering questions that arise during the construction project. Over the course of a construction project, however, complex questions may arise that cannot be answered by referencing a single digital data object and perhaps not even a single type of digital data object for the construction project. Instead, to answer these kinds of complex questions, a given party involved in the construction project may need to locate and review many different digital data objects of many different types and then synthesize the information gathered across those digital data objects, which may in turn require the use of many different software tools to access and review such digital data objects. This is a complex endeavor and can lead to several downstream problems.

First, as the volume of digital data objects created for a construction project increases, it becomes increasingly difficult (or maybe even impractical) for a given party involved in the construction project to locate the relevant digital data objects created for the construction project for answering a complex question concerning the construction project, which may lead to costly delays.

Second, even if it may be possible for a given party involved in a construction project to locate relevant digital data objects, the given party may expend a significant amount of time and resources to allocate and retrieve the relevant digital data objects to answer a question concerning the construction project, which is undesirable because it may allocate the given party's resources away from engaging in other tasks. For instance, the complex nature of a question concerning a construction project may require multiple steps to answer the question, which may involve multiple individuals associated with the given party searching for multiple digital data objects and formulating a final answer to the question.

Third, given the large volume of digital data objects that are typically created and stored for a construction, the complex nature of some types of digital data objects (e.g., drawings), and/or the pressure to answer questions concerning a construction project in a timely fashion, a given party involved in the construction project may end up answering a complex question in an inaccurate way due to a failure to locate the relevant digital data objects and/or a reliance on the wrong digital data objects (e.g., objects containing outdated information). Such inaccuracies may cause confusion and communication errors, which in turn may lead to costly project delays.

Unfortunately, existing construction management software applications do not include any technology for quickly, efficiently, and accurately answering complex questions about a construction project that require reference to multiple different digital data objects of multiple different types. For instance, while the existing construction management software application offered by Procore includes various software tools that enable users to access and review various different types of digital data objects, Procore's existing construction management software application does not include technology for quickly, efficiently, and accurately answering complex questions about a construction project that require reference to multiple different digital data objects of multiple different types.

To address these and other problems associated with existing construction management software applications, disclosed herein is new software technology for answering questions related to a construction project using an architecture of Artificial Intelligence (AI) agents.

In practice, the disclosed software-based pipeline may be integrated into a construction management software application or provided as a standalone software tool, among other possibilities. For instance, as one possible implementation, the disclosed software-based pipeline may be integrated into a construction management software application comprising both front-end software running on client devices (e.g., client devices 104A-C of FIG. 1) that are accessible to individuals associated with construction projects (e.g., contractors, project managers, architects, engineers, designers, etc.) and back-end software running on a back-end computing platform (e.g., back-end computing platform 102 of FIG. 1) that interacts with and/or drives the front-end software. As another possible implementation, the disclosed software-based pipeline may be integrated into a construction management software application comprising front-end client software that runs on client devices without interaction with a back-end computing platform. The disclosed software technology may take other forms as well.

In accordance with the present disclosure, the disclosed software-based pipeline may provide several advantages over existing construction management software applications. First, instead of requiring a given party involved in a construction project to locate relevant digital data objects created for the construction project in order to answer a complex question concerning the construction project, the disclosed software-based pipeline may utilize an AI agent to efficiently locate relevant digital data objects created for the construction project and then use those digital data objects as a basis for generating a response to the user's question. This may allow the given party involved in the construction project to allocate more resources to other tasks, which may lead to cost savings.

Second, the disclosed software-based pipeline may utilize multiple AI agents to process a complex question concerning a construction project more efficiently, which may involve utilizing a first AI agent to decompose the complex question into a set of sub-queries that can be answered individually by second and third AI agents, and utilizing a fourth AI agent that may function to compose a final answer to the complex question based on the respective answers to the sub-questions in the set.

Third, because the disclosed software-based pipeline utilizes multiple AI agents to answer complex questions concerning a construction project, the disclosed software-based pipeline may significantly reduce the number of human errors involved in answering such complex questions (e.g., answering a complex question in an inaccurate way due to a failure to locate the relevant digital data objects and/or a reliance on the wrong digital data objects).

The disclosed software-based pipeline may provide several other advantages over existing construction management software applications as well. The advantages of the disclosed software-based pipeline over existing construction management software applications discussed herein and additional advantages of the disclosed software-based pipeline over existing construction management software applications may be apparent from the example software-based pipeline 200 of FIG. 2 described below.

Figure 2:
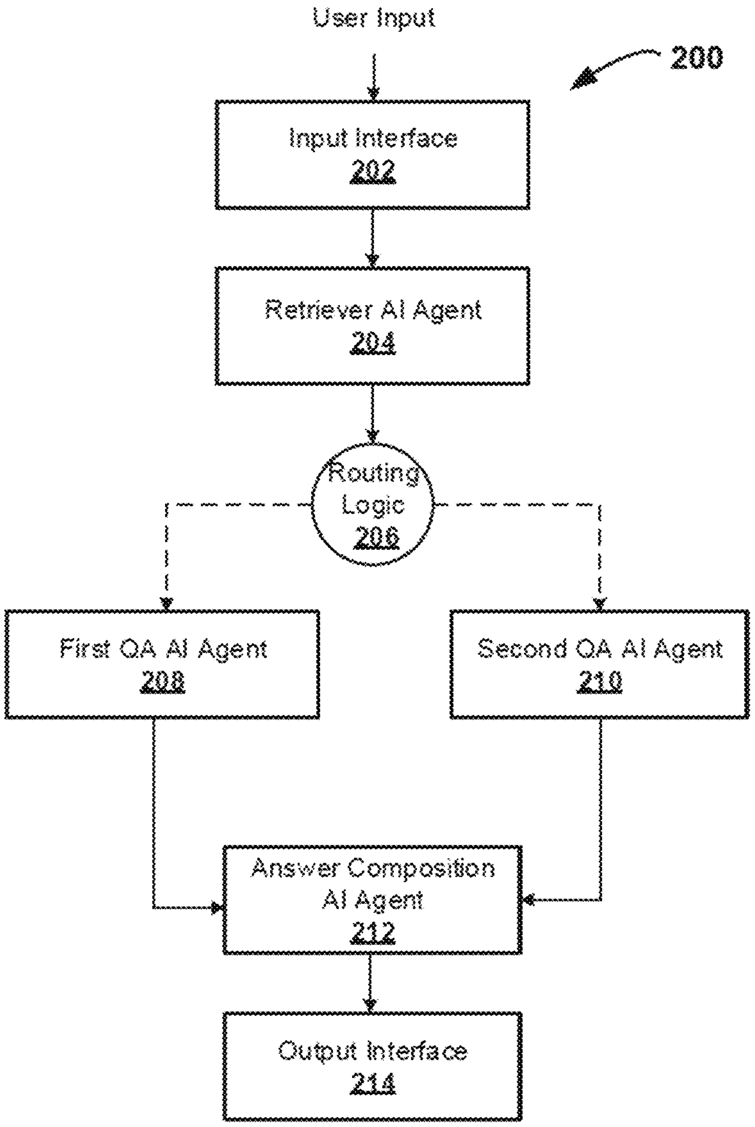
FIG. 2 depicts an example software-based pipeline for answering questions related to a construction project.

Turning now to FIG. 2, an example software-based pipeline 200 comprising the disclosed architecture of AI agents is illustrated. In practice, the example software-based pipeline 200 may be encoded in the form of program instructions that are executable by one or more processors of a computing platform, and for purposes of illustration, the example software-based pipeline 200 is described as being installed on and executed by the back-end computing platform 102 of FIG. 1, but it should be understood that the example software-based pipeline 200 may be installed on and executed by any one or more computing platforms that are capable of performing the example operations of the example software-based pipeline 200. Further, it should be understood that the example software-based pipeline 200 is merely described in this manner for the sake of clarity and explanation and that the example operations may be implemented in various other manners, including the possibility that operations may be added, removed, rearranged into different orders, combined into fewer blocks, and/or separated into additional blocks depending upon the particular embodiment.

As shown, the example software-based pipeline 200 comprises multiple different types of AI agents that may be utilized to generate a final answer to a given question concerning a given construction project, which are referred to herein as (i) a "retriever" AI agent, (ii) a first "question-answering" (QA) AI agent, (iii) a second QA AI agent, and (iv) an "answer composition" AI agent.

At a high level, an AI agent may be a software component that provides an interface to a given AI model and is configured to perform various functions in order to accomplish a respective type of task that is preconfigured for the agent. For instance, as discussed in further detail below, a first AI agent may be preconfigured to perform functions for accomplishing a first type of task, a second AI agent may be preconfigured to perform functions for accomplishing a second type of task, etc. In some implementations, the example AI agents may each be implemented in the form a discrete executable software component, which is how the AI agents are shown in FIG. 2 and described below for purposes of illustration, but it should be understood that in other implementations, the AI agents may each be implemented in the form a discrete configuration file (e.g., a YAML file) that, loaded by a centralized execution engine, causes the centralized execution engine to perform the functions for the AI agent.

Any of the disclosed AI agents herein may be preconfigured to interface with one or more AI models that may each comprise any of various types of AI models. As one possibility, any of the disclosed AI agents may be preconfigured to interface with any of various types of generative AI models, such as a transformer-based model (e.g., a language model such as a large language model (LLM) and/or a multimodal model such as a vision-language model (VML)), a diffusion model, a model based on a generational adversarial network (GAN), and/or a model based on a variational autoencoders (VAEs), among other possible types of generative AI models. Further, a generative AI model associated with one of the disclosed AI agents may comprise a pre-trained generative AI model (e.g., an "off-the-shelf" generative AI model) that may or may not be further trained (e.g., via fine tuning, few-shot learning, or the like), or may comprise a generative AI model that is trained in the first instance to perform the tasks described herein, among other possibilities. Some representative examples of pre-trained generative AI models include a generative pre-trained transformer (GPT) type of generative AI model, a bidirectional encoder representations from transformers (BERT) type of generative AI model, a bidirectional auto-regressive transformer (BART) type of generative AI model, a text-to-text transfer transformer (T5) type of generative AI model, a pre-training with extracted gap sentences for abstractive summarization (PEGASUS) type of generative AI model, a large language model meta AI (LlaMA) type of generative AI model, a Phi-2 or Phi-3 type of generative AI model, a PaliGemma type of generative AI model, and/or a Florence-2 type of generative AI model, among other examples.

As another possibility, any of the disclosed AI agents may be preconfigured to interface with any of various types of discriminative AI models that may be trained via a machine learning process to perform a specific task, examples of which may include a decision-tree model (e.g., a Random Forest model or a gradient-boosted decision tree (GBDT) model), a neural-network-based model (e.g., a neural-network-based model that configured to receive unstructured input such as unstructured text, images, audio, etc.), a regression model (e.g., derived via Lasso regression, logistic regression, linear regression, polynomial regression, etc.), a nearest-neighbor model (e.g., k-nearest neighbor, BallTree, KDTree, etc.), a support vector machine (SVM) model, and/or a Bayesian model (e.g., a Bayesian belief network), among other possibilities.

The disclosed AI agents herein may be preconfigured to interface with one or more AI models that may each comprise various other types of AI models as well.

Further, in practice, a given AI agent's associated AI model could either be included as part of the given AI agent itself or could be external to the given AI agent and accessed via an API or the like.

In accordance with the present disclosure, each given AI agent may be configured to perform various functions, such as (i) generating a prompt for a given AI model and providing it as input to a given AI model via an interface with the given AI model, (ii) storing certain data associated with the respective task to be accomplished by the given AI agent (e.g., data related to the inputs and outputs of the given AI model), and/or (iii) sending the output(s) of the given AI model to one or more other AI agents (either directly or indirectly), which may then perform additional functions. In this regard, the disclosed AI agents may take various forms.

At a high level, as one possible implementation, the retriever AI agent may be configured to receive user input that comprises a question concerning a given construction project (which may be referred to herein as a "user query") and then carry out certain functions with respect to the user query.

First, the retriever AI agent may be preconfigured to interface with at least one given AI model in order to decompose the user query into a set of sub-queries. In this respect, the retriever AI agent may generate a prompt for the given AI model comprising a request to decompose the user query and provide that prompt to the given AI model, which may in turn function to (i) receive the prompt as input, (ii) decompose the user query into a set of sub-queries, and (iii) return the set of sub-queries to the retriever AI agent.

Generally speaking, decomposing a user query into a set of sub-queries may be useful in some instances where the user query involves a complex question concerning a given construction project that may require a multi-part answer, multiple steps to formulate an answer to the user query, and/or may require referencing multiple digital data objects (and/or multiple different types of digital data objects) to formulate the answer to the user query, among other possibilities. However, it should be understood that not every user query may involve such a complex question and thus may not always need to be decomposed into a set of sub-queries. Accordingly, it should be understood that, while the retriever AI agent may provide a prompt to the given AI model as input in order to decompose a user query into a set of sub-queries, the retriever AI agent may not need to interact with the given AI model in some instances where the user query is not as complex and may not need to be decomposed into a set of sub-queries. For the sake of clarity and explanation, however, it should be understood that an example user query described herein involves complex a question that requires decomposing the user query into a set of sub-queries.

Second, the retriever AI agent may function to search and retrieve, for each sub-query in the set, a respective subset of one or more digital data objects that are relevant to answering the sub-query. The retriever AI agent may perform this search function in any of various manners as discussed below.

Third, after decomposing the user query into the set of sub-queries and retrieving the respective subsets of one or more digital data objects, the retriever AI agent may output the set of sub-queries and the respective subsets of one or more digital data objects for use by one or more downstream AI agents.

In turn, one or more QA AI agents (e.g., the first QA AI agent and the second QA AI agent) may be utilized to formulate an answer to each sub-query in the set using the subset of one or more digital data objects (or information included therein) retrieved for each sub-query in the set. In this respect, at a high level, each of the QA AI agents (e.g., the first QA AI agent and the second QA AI agent) may be configured to receive one or more of the sub-queries in the set of sub-queries and then formulate an answer for each received sub-query. The QA AI agents may be preconfigured to perform different types of QA functionality. For instance, the first QA AI agent may be preconfigured to interface with at least a first AI model to perform functions for answering sub-queries that do not require knowledge of any named entities that are referred to in a given construction project (e.g., names of individuals, parties, locations, roles of individuals, addresses, events, types of digital data objects, etc.), while the second QA AI agent may be preconfigured to interface with at least a second AI model to perform functions for answering sub-queries that do require knowledge of named entities.

In this regard, the first QA AI Agent may be configured to receive one or more sub-queries that do not require knowledge of any named entities, and then for each respective sub-query that is received, (i) generate a prompt for the first AI model comprising a request to answer the respective sub-query along with a subset of one or more digital data objects that are relevant to the respective sub-query and (ii) provide the prompt to the first AI model. In turn, the first AI model may function to (i) receive the prompt, (ii) formulate a respective answer for the respective sub-query, and (iii) return the respective answer for the respective sub-query back to the first QA AI agent.

In contrast, the second QA AI Agent may be configured to receive one or more sub-queries that require knowledge of named entities, and then for each respective sub-query that is received, (i) generate a prompt for the second AI model comprising a request to answer the respective sub-query along with a subset of one or more digital data objects that are relevant to the respective sub-query and (ii) provide the prompt to the second AI model. In turn, the second AI model may function to (i) receive the prompt, (ii) formulate a respective answer for the respective sub-query, and (iii) return the respective answer for the respective sub-query back to the second QA AI agent.

After the first and second QA AI agents formulate answers to the sub-queries in the set, an answer composition AI agent may be utilized to combine the answers and formulate a final answer to the user query concerning the given construction project. In this respect, at a high level, the answer composition AI agent may be provided with (i) the user query before it was decomposed into the set of sub-queries, and (ii) the set of sub-queries along with the answers that are determined by the first QA agent and/or the second QA agent. In turn, the answer composition AI agent may function to generate a prompt for a given AI model comprising a request to compose a final answer to the user query based on the answers to the sub-queries and then provide the prompt to the given AI model, which may in turn function to (i) receive the prompt, (ii) formulate a final answer to the user query based on the answers to the sub-queries, and (iii) return the final answer back to the answer composition AI agent. After receiving the final answer to the user query, the answer composition AI agent may then output the final answer.

Each of the foregoing functions described above may take various forms as further discussed below with respect to the example software-based pipeline 200.

Further, it should be understood that the example functions of each disclosed AI agent are merely described in this manner for the sake of clarity and explanation and that the example functions of any of the disclosed AI agents may be implemented in various other manners, including the possibility that some example functions described with respect to a given AI agent may be performed by one or more additional AI agents and/or the possibility that additional functions may be performed by a given AI agent disclosed herein. For instance, the search and retrieval functions that are described herein with respect to the retriever AI agent may be performed by one or more additional AI agents (not shown) that could be utilized in the example software-based pipeline 200. The example functions of the disclosed AI agents may be implemented in various other manners as well.

As shown in FIG. 2, the example software-based pipeline 200 may also comprise other functional components that work together with the disclosed AI agents to generate a final answer to a user query in accordance with the present disclosure. For instance, as shown, the example software-based pipeline 200 may begin with an input interface 202 that is configured to receive a user input that comprises a user query concerning a given construction project. The user input that comprises the user query may initially be input in any of various forms, examples of which may include a text-based input (e.g., a typed question) or a voice-based input (e.g., a spoken question). Generally speaking, the user query can be any type of question concerning the given construction project and thus, the user query may take various forms.

For instance, the user query may take the form of a single question, a multi-part question, a question that may require summarizing information (e.g., information included in one or more digital data objects), among other forms of a question. To illustrate some specific examples, the user query may take the form of a question concerning the status of a given task for the given construction project (e.g., "What is the progress of the electrical installation in all the buildings for the X project?"), a question concerning the project schedule for the given construction project (e.g., "Which subcontractors are behind schedule on the X project, and what are the delays?"), a question concerning the cost associated with the given construction project (e.g., "What are the change orders for the X project, and how do they impact the overall budget?"), among other possible questions that may arise for the given construction project. The user query may take various other forms as well.

In practice, the user input that comprises the user query may be provided to the input interface 202 in various manners. As one possible implementation, the user input may be provided by a given user via front-end software running on a given client device (e.g., client device 104A, 104B, or 104C of FIG. 1), which may encode the user input into a communication (e.g., one or more messages) and send it to the back-end computing platform 102 over a network-based communication path. The user input may be provided to the input interface 202 in various other manners well-including but not limited to the possibility that the user input may be provided in response to a triggering event rather than by the given user.

Further, the user input may be provided at any of various times. As one possibility, while accessing front-end software running on a given client device (e.g., client device 104A, 104B, or 104C of FIG. 1), the given user may provide the user input, which may be accomplished by interacting with a user-interface view of the front-end client software, and the user input may be sent to the back-end computing platform 102, which may provide it as input to the input interface 202 of the example software-based pipeline 200. As another possibility, the front-end or back-end software of the construction management software application may provide the user input in response to certain triggering events. One of ordinary skill in the art would appreciate that the user input may be provided at various other times as well.

After the user input comprising the user query is received by the input interface 202, the input interface 202 may pass the user input to the retriever AI agent 204, which may perform various functions in line with the discussion above.

For instance, the retriever AI agent 204 may function to decompose the user query into a set of sub-queries using a given AI model, which may take the form of a generative AI model. In this respect, the retriever AI agent 204 may be configured to receive the user input and generate a prompt for the given AI model comprising a request to decompose the user query. The function of generating the prompt may take various forms.

In one example implementation, the function of generating the prompt may involve transforming the received user input that includes the user query into the prompt which may comprise (i) the user query (or a revised version thereof), (ii) an instruction for the given AI model to decompose the user query into a set of sub-queries, and perhaps also (iii) additional data that may be utilized by the given AI model when performing the task of decomposing the user query into the set of sub-queries (e.g., role data, context data, etc.). In this respect, the additional data that may be included in the prompt may take various forms.

For example, the additional data may include a given role that the given AI model may perhaps consider in decomposing the user query into the set of sub-queries (e.g., information to decompose the user query from the perspective of a project manager of the given construction project). As another example, the additional data may include a particular goal (or set of goals) that the given AI model may perhaps consider in decomposing the user query into the set of sub-queries (e.g., a goal to decompose the user query into no more than a given number of sub-queries, a goal not to decompose the user query if the answer is trivial, among other possibilities). The additional data may take various other forms as well.

It should be understood that while the prompt may comprise such additional data that may be separate from the instruction for the prompt, in some implementations, the additional data may be included as part of the instruction itself. Further, the prompt may include other components and may take various other forms, The function of generating the prompt for the given AI model associated with the retriever AI agent 204 may also involve other operations. For example, in conjunction with transforming the user input into the prompt for the given AI model, the function of generating the prompt may involve performing data cleaning operations on the user query included in the user input. The data cleaning operations may involve formatting the user query to correct informalities, such as typographical and/or grammatical errors, linguistic inconsistencies, or the like. The function of generating the prompt for the given AI model may take various other forms as well.

After the retriever AI agent 204 generates the prompt, the retriever AI agent 204 may provide that prompt to the given AI model. The given AI model may in turn function to receive the prompt as input and decompose the user query included in the prompt into a set of sub-queries. This function of decomposing the user query into the set of sub-queries may take various forms.

As one possible implementation, decomposing the user query may involve the given AI model carrying out any of various types of chain-of-thought (or "CoT" for short) reasoning techniques (e.g., zero-shot CoT, automatic CoT, or the like) to divide the user query into the set of sub-queries. In this regard, instead of attempting to generate an answer to the user query directly, the disclosed architecture may leverage the chain-of-thought reasoning capabilities of the given AI model (which as noted above may take the form of a generative AI model) to divide the user query (which may be a complex question) into a set of sub-queries, where each sub-query in the set may be answered individually, and the collective answers to the sub-queries in the set may be used to formulate a final answer to the user query.

To illustrate one specific example, the given AI model may carry out a chain-of-thought reasoning technique to divide the user query "What is the progress of the electrical installation in all the buildings for the X project?" into the following set of sub-queries: (i) "What is the list of buildings under the X project?"; (ii) "What is the status of the electrical installation in the Building A of the X project?"; and (iii) "What is the status of the electrical installation in the Building B of the X project?"

As another example, the given AI model may carry out a chain-of-thought reasoning technique to divide the user query "Which subcontractors are behind schedule on the X project, and what are the delays?" into the following set of sub-queries: (i) "What subcontractors are working on the X project?"; (ii) "What is the current schedule status of subcontractor A?"; (3) "What is the current schedule status of subcontractor B?"; and (iii) "For each of the subcontractors that are behind schedule, what are the specific delays for the respective subcontractor?"

As yet another example, the given AI model may carry out a chain-of-thought reasoning technique to divide the user query "What are the change orders for the X project, and how do they impact the overall budget?" into the following set of sub-queries: (i) "What are the change orders for the X project?"; and (ii) "For each change order, how does the change order impact the overall budget?" Other examples involving more or less sub-queries are possible as well, which may depend on the complexity of the user query.

Further, it should be understood that the given AI model associated with the retriever AI agent 204 may leverage various other types of techniques to decompose the user query into the set of sub-queries. For instance, the given AI model may leverage a least-to-most technique, self-ask technique, and/or a tree of thoughts technique, among various other types of techniques to decompose the user query into the set of sub-queries. The function of decomposing the user query into the set of sub-queries may take various other forms as well.

After decomposing the user query into the set of sub-queries, the given AI model may return the set of sub-queries to the retriever AI agent 204. In turn, for each sub-query in the set, the retriever AI agent 204 may search for digital data objects (which may take the form of any of the various types of digital data objects discussed above) that may be relevant to answering the sub-query. This search function may take various forms.

As one possible implementation, for each sub-query in the set, the retriever AI agent 204 may utilize a semantic search technique that interprets the meaning of the sub-query to generate search results that include a respective subset of one or more digital data objects that are related to the sub-query and are thus, relevant to answering the sub-query. For instance, as one possibility, the semantic search technique may comprise a vector search technique that involves (i) a pre-processing phase during which an embedding model is used to transform each of at least a subset of the digital data objects created for the given construction project into a corresponding set of embeddings (also referred to as "vector embeddings" or simply "vectors"), which are then stored in one or more data stores for future use (e.g., one or more data stores included in a data storage layer of the back-end computing platform 102), and (ii) a search phase during which an embedding model (which may be the same embedding model used to transform the digital data objects or a different embedding model) is used to transform each sub-query into a corresponding set of one or more embeddings and the sub-query embeddings are then compared against the embeddings in the one or more data stores in order to identify, for each respective sub-query in the set, a respective subset of one or more digital data objects that are related to the respective sub-query. In this regard, the sets of one or more embeddings that are generated by the embedding models for the digital data objects and the sub-queries may take any of various forms (e.g., document embeddings, sentence embeddings, word embeddings, or the like).

In practice, prior to the embedding model receiving a given digital data object to be transformed into a corresponding set of one or more embeddings, the retriever AI agent 204 may also function to pre-process the given digital data object such that the given digital data object is in a proper format for the embedding model. This pre-processing function may take various forms, which may depend on the type of digital data object that is to be transformed.

As one possibility, the pre-processing function may involve joining multiple textual elements together (e.g., multiple lines of text included in a given digital data object) based on a set of rules to create a string of text for the given digital data object that can be provided to the embedding model as input and transformed into a set of one or more embeddings.

As another possibility, the pre-processing function may involve transforming certain structured elements found in a given digital data object into a string of text that can be provided to the embedding model as input and transformed into a set of one or more embeddings.

As yet another possibility, the pre-processing function may involve applying optical character recognition (OCR) to detect textual elements that are depicted in a given digital data object (e.g., a drawing, a specification, or the like) and converting the detected textual elements into a usable encoding (e.g., American Standard Code for Information Exchange (ASCII) or Unicode). The pre-processing function may take various other forms as well.

Further, in some implementations, for each respective sub-query in the set, in addition to searching for the respective subset of one or more digital data objects that are related to the respective sub-query, the retriever AI agent 204 may also search for one or more additional digital data objects that may have a particular relationship (e.g., familial relationship) with the respective subset of one or more digital data objects but were not identified as being related to the sub-query. It should be understood, however, that in some instances, a respective subset of one or more digital data objects that are deemed to be related to a given sub-query may comprise any digital data object that has a particular relationship (e.g., familial relationship) with the one or more digital data objects in the subset.

In practice, relationships between the digital data objects that are stored in the one or more data stores may be represented in various manners.

For example, each digital data object stored in the one or more data stores may be associated with metadata that may indicate whether the digital data object has a particular relationship (e.g., familial relationship) with one or more other digital data objects stored in the one or more data stores, and the retriever AI agent 204 may use the metadata to conduct its search. As another example, the embedding model used to transform digital data objects into corresponding sets of one or more embeddings may take such relationships (e.g., familial relationships) between the digital data objects into account, such that the sets of one or more data objects between digital data objects having familial relationships may comprise similar embedding values. The relationship between the digital data objects that are stored in the one or more data stores may be represented in various other manners as well. For instance, a combination of the foregoing examples involving metadata and the embedding model may be used to represent the relationship between digital data objects that are stored in the one or more data sores.

Further, in practice, the embedding model that is used to transform the digital data objects and/or the sub-queries into corresponding sets of one or more embeddings may comprise any one of various types of embedding models that are capable of generating embeddings. In this respect, such an embedding model may comprise a pre-trained document, sentence, or word embedding model that may be further trained (e.g., via fine tuning, few-shot learning, or the like), or may comprise a document, sentence, or word embedding model that is trained in the first instance, among other possibilities. Some representative examples of embedding models include a Doc2Vec, Sentenc2Vec, or Word2Vec type of embedding model, a GloVe type of embedding model, an ElMo type of embedding model, a fastText type of embedding model, and a BERT type of embedding model, among others. It should be understood, however, that the embedding model that is used to transform the digital data objects and/or the sub-queries into sets of embeddings may take various other forms as well.

The function of searching for respective subsets of one or more digital data objects that are relevant to answering the sub-queries in the set may take various other forms as well. As one possibility, instead of utilizing a vector search technique (or in conjunction with utilizing the vector search technique), the semantic search technique may comprise one or more various other types of sematic search techniques, examples of which may include query classification, semantic query parsing, knowledge graphs, among other possibilities. As another possibility, instead of using a semantic search technique (or in conjunction with using a semantic search technique), for each respective sub-query in the set (or a subset thereof), the retriever AI agent 204 may utilize a keyword search technique to search for a respective subset of one or more digital data objects that match a set of words included in the respective sub-query. Other implementations are possible as well.

Further, it should be understood that the searching function may be performed at various times. For instance, the retriever AI agent 204 may search for a first respective subset of one or more digital data objects relevant to a first sub-query in the set either in parallel with its search for a second respective subset of one or more digital data objects relevant to a second sub-query in the set, or in series, such that a search may be performed at different times for each sub-query in the set.

After searching for the respective subsets of one or more digital data objects that may be used to answer the sub-queries in the set, the retriever AI agent 204 may retrieve the respective subsets of one or more digital data objects, or certain information included in the respective subsets of one or more digital data objects. In this respect, this retrieval function may take various forms, which may depend on the nature of the sub-query.

In one example implementation, for a given sub-query in the set, the retriever AI agent 204 may retrieve a subset of information included in the respective subset of one or more digital data objects (e.g., a section or sentence from the given digital data object) that has been found for the given sub-query from its search. For example, if the given sub-query is "What is the project deadline?", the retriever AI agent 204 may analyze the respective subset of one or more digital data objects that has been found for the given sub-query from its search and may retrieve information included in the respective subset of one or more digital data objects that may in turn be used by one or more downstream AI agents to formulate an answer to the given sub-query (e.g., a particular date included in one of the digital data objects in the subset that may identify a project deadline).

In another example implementation, for a given sub-query in the set, the retriever AI agent 204 may retrieve the respective subset of one or more digital data objects (in their entirety) that has been found for the given sub-query from its search. For example, if the given sub-query in the set requires a summary of the respective subset of one or more digital data objects that has been found for the given sub-query from the search, the retriever AI agent 204 may retrieve the respective subset of one or more digital data objects in their entirety instead of retrieving a subset of information included in the respective subset of one or more digital data objects.

In yet another example implementation, the retriever AI agent 204 may utilize a recursive approach to retrieve information included in the respective subset of one or more digital data objects that has been found from its search for a given sub-query. For instance, the retriever AI agent 204 may (i) retrieve a first subset of information included in the respective subset of one or more digital data objects that has been found for the given sub-query, (ii) determine whether the subset of information is sufficient to answer the given sub-query (perhaps with the assistance of the given AI model), and (iii) if the subset of information is likely not sufficient to answer the given sub-query, retrieving another subset of information included in the respective subset of one or more digital data objects until enough subsets of information have been retrieved to answer the given sub-query.

The retriever AI agent 204 may retrieve the respective subsets of one or more digital data objects or information included in the respective subsets of one or more digital data objects that have been found from its search in various other manners well.

After the retriever AI agent 204 retrieves the respective subsets of one or more digital data objects (or information included therein) that are relevant to the sub-queries in the set, the retriever AI agent 204 may output the set of sub-queries and the respective subsets of one or more digital data objects (or information included therein). The retriever AI agent 204 may perform various other functions as well.

Further, while the retriever AI agent 204 has been described as performing various functions described above, it should be understood that one or more additional AI agents (not shown) may be utilized in the example software-based pipeline 200 to carry out some of those functions instead of the retriever AI agent 204 (or in conjunction with the retriever AI agent 204). For instance, in some implementations, the retriever AI agent 204 may be split into (i) a first AI agent (not shown) that functions to decompose the user query into the set of sub-queries using the given AI model described above, and (ii) a second AI agent (not shown) that functions to search for the respective subsets of one or more digital data objects that are relevant to the sub-queries in the set, as well as to retrieve the respective subsets of one or more digital data objects (or information included therein). Other implementations involving more or less AI agents are possible as well.

After the retriever AI agent 204 outputs the set of sub-queries and the respective subsets of one or more digital data objects (or information included therein), the set of sub-queries and the respective subsets of one or more digital data objects (or information included therein) may be passed to the routing logic 206. For each sub-query in the set, the routing logic 206 may then function to determine whether to route the sub-query and the respective subset of one or more digital data objects (or information included therein) retrieved for the sub-query to (i) the first QA AI agent 208 or (ii) the second QA AI agent 210 At a high level, this function may involve determining whether a sub-query requires knowledge of any named entities and then either (i) routing to the first QA AI agent 208 if the sub-query does not require knowledge of any named entities or (ii) routing to the second QA AI agent 208 if the sub-query does require knowledge of a named entity. In this respect, the routing logic 206 may utilize an AI model (e.g., a generative AI model or a discriminative AI model), a rules-based model, or the like to make the determination of whether the sub-query requires knowledge of any named entities and then use this determination as the basis for the routing decision, among various other possibilities.

The routing logic 206 may determine where to route the set of sub-queries and the respective subsets of one or more digital data objects (or information included therein) in various other manners as well.

In turn, the first QA AI agent 208 may function to receive one or more sub-queries that do not require knowledge of any named entities, along with the respective subset of one or more digital data objects (or information included therein) retrieved for each of those one or more sub-queries, while the second QA AI agent 210 may function to receive one or more sub-queries that do require knowledge of named entities, along with the respective subset of one or more digital data objects (or information included therein) retrieved for each of those one or more sub-queries. In turn, the first QA AI agent 208 and the second QA AI agent 210 may each perform various functions.

For instance, for each respective sub-query that is received by the first QA AI agent 208, the first QA AI agent 208 may be preconfigured to interface with at least a first AI model and function to generate a prompt for the first AI model that comprises a request to answer the respective sub-query, where the first AI model may be suitable for answering sub-queries that do not require knowledge of any named entities. For instance, the first AI model may comprise a pre-trained generative AI model, among various other possibilities. For each prompt that is received, the first AI model may be configured to use natural language processing (or the like) to determine the meaning of the respective sub-query included in the prompt and then formulate an answer to the respective sub-query. For example, for each prompt that is received, the first AI model may utilize natural language understanding to determine what the respective sub-query is asking for, which may involve identifying meaningful components from the respective sub-query, such as nouns, verbs, sentiment, and/or intent. In turn, the first AI model may analyze the respective subset of one or more digital data objects (or information included therein) retrieved for the respective sub-query and formulate an answer for the respective sub-query, which may involve using natural language generation techniques to formulate the answer.

The function of generating the prompt for the first AI model may take various forms. In one example implementation, this function may involve, for each respective sub-query that is received, transforming the respective sub-query and the respective subset of one or more digital data objects (or information included therein) retrieved for the respective sub-query into a prompt that comprises (i) an instruction for the first AI model to formulate a respective answer for the respective sub-query, (ii) the respective subset of one or more digital data objects (or information included therein), and perhaps also (iii) additional data that may be utilized by the first AI model when performing the task of formulating the respective answer (e.g., role data, context data, etc.). In this respect, the additional data that may be included in the prompt may take various forms.

For example, the additional data may include a given role that the first AI model may perhaps consider in formulating the respective answer (e.g., information to formulate the respective answer from the perspective of a project manager of the given construction project). As another example, the additional t data may include a particular goal (or set of goals) that the given AI model may perhaps consider in formulating the respective answer (e.g., a goal to formulating the respective answer in no more than a given number of words, sentences, and/or paragraphs, among other possibilities). The additional data may take various other forms as well.

In line with the discussion above, it should be understood that while the prompt may comprise additional data that may be separate from the instruction for the prompt, in some implementations, the additional data may be included as part of the instruction. Further, the prompt may include other components and may take various other forms, and the function of generating the prompt for the first AI model may take various other forms as well.

For each respective sub-query that is received by the first QA AI agent 208, after generating the prompt for the respective sub-query, the first QA AI agent 208 may function to provide the prompt to the first AI model, which may in turn function to (i) receive the prompt, (ii) formulate a respective answer for the respective sub-query, and (iii) return the respective answer for the respective sub-query back to the first QA AI agent 208.

Thereafter, the first QA AI agent 208 may provide the respective answer for each respective sub-query to the answer composition AI agent 212.

Along similar lines, for each respective sub-query that is received by the second QA AI agent 210, the second QA AI agent 210 may be preconfigured to interface with at least a second AI model and function to generate a prompt for the second AI model that comprises a request to answer the respective sub-query, where the second AI model may be suitable for answering sub-queries that do require knowledge of any named entities. For instance, the second AI model may comprise a fine-tuned (or custom-trained) generative AI model and/or a discriminative AI model, among various other possibilities. In this regard, the second AI model may be configured to answer sub-queries in various manners.

As one possibility, for each prompt that is received, the second AI model may be configured to use natural language processing (or the like) to determine the meaning of the respective sub-query included in the prompt and then formulate an answer to the respective sub-query. For example, for each prompt that is received, the second AI model may utilize named-entity recognition (NER) to identify named entities (e.g., names of individuals, parties, locations, roles of individuals, addresses, events, types of digital data objects, etc.) from the respective sub-query included in the prompt and utilize natural language understanding to determine the overall meaning of the respective sub-query, which may involve identifying meaningful features from the respective sub-query, such as nouns (which may include the identified named entities from NER), verbs, sentiment, and/or intent. In turn, the second AI model may analyze the respective subset of one or more digital data objects (or information included therein) retrieved for the respective sub-query and formulate an answer for the respective sub-query, which may involve using natural language generation techniques to formulate the answer.

As another possibility, the second AI model may take the form of a discriminative AI model that is preconfigured to perform a given task. In this regard, for a given digital data object included in the respective subset that is retrieved for a respective sub-query, the second AI model may be configured to receive an image included in the given digital data object, extract meaningful features from the image (e.g., distinctive structures from a drawing, a specification, or the like), and then output information about the image (e.g., identify the number of rooms included in a drawing, identify when a specification was last revised, identify the party who created the digital data object, etc.).

As another possibility, the second AI model may take the form of a VQA-based model. In this regard, for each prompt that is received, the second AI model may be configured to analyze the respective subset of one or more digital data objects (or information included therein) retrieved for the respective sub-query included in the prompt, which may involve extracting meaningful image features from the one or more digital data objects in the respective subset (e.g., distinctive structures from a drawing, a specification, or the like). For each prompt that is received, the second AI model may also be configured to analyze the respective sub-query included in the prompt, which may involve identifying named entities from the respective sub-query and determining the overall meaning of the respective sub-query similar to the discussion above. In turn, the second AI model may combine the features extracted from the respective sub-query and the image features extracted from the one or more digital data objects in the respective subset using one of various techniques (e.g., simple concatenation, linear classification, a Bayesian approach based on probabilistic modeling, or the like), and then formulate an answer for the respective sub-query, which may involve using natural language generation techniques to formulate the answer.

The second AI model may be configured to answer sub-queries in various other manners as well.

The function of generating the prompt for the second AI model may take various forms. In one example implementation, this function may involve, for each respective sub-query that is received, transforming the respective sub-query and the respective subset of one or more digital data objects (or information included therein) retrieved for the respective sub-query into a prompt that comprises (i) an instruction for the second AI model to formulate a respective answer for the respective sub-query, (ii) the respective subset of one or more digital data objects (or information included therein), and perhaps also (iii) additional data that may be utilized by the second AI model when performing the task of formulating the respective answer (e.g., role data, context data, etc.). In this respect, the additional data that may be included in the prompt may take any of various forms, including any of the various described above in connection with the first AI model.

For each respective sub-query that is received by the second QA AI agent 210, after generating the prompt for the respective sub-query, the second QA AI agent 210 may function to provide the prompt to the second AI model, which may in turn function to (i) receive the prompt, (ii) formulate a respective answer for the respective sub-query, and (iii) return the respective answer for the respective sub-query back to the second QA AI agent 208.

To illustrate, the second AI model may receive a given prompt comprising the respective sub-query "What is the layout of this drawing?" and a respective subset of one or more digital data objects (or information included therein) retrieved for the respective sub-query to formulate an answer to the respective sub-query. The second AI model may then identify layout data for the drawing (e.g., room dimensions, floor plans, key structural elements) from the respective subset of one or more digital data objects (or information included therein), and formulate the respective answer for the respective sub-query.

Thereafter, the second QA AI agent 210 may provide the respective answer for each respective sub-query to the answer composition AI agent 212.

The first QA AI agent 208 and second QA AI agent 210 may perform various other functions as well and may take various other forms as well. For instance, while the first QA AI agent 208 has been described as being preconfigured to interface with the first AI model and the second QA AI agent 210 has been described as being preconfigured to interface with the second AI model, it should be understood that one or both of the first QA AI agent 208 or the second QA AI agent 210 may be preconfigured to interface with more than one AI model, where one AI model associated with one of the QA AI agents may take the form of a generative AI model and another AI model associated with that QA AI agent may take the form of a discriminative AI model, among various other possibilities.

Further, while the example software-based pipeline 200 has been described to include two QA AI agents (i.e., the first QA AI agent 208 and the second QA AI agent 210) to formulate respective answers for the set of sub-queries, it should be understood that more than two QA AI agents may be utilized to formulate respective answers for the sub-queries in the set. For instance, more than two QA AI agents may be utilized, where each QA AI agent may be preconfigured to interface with a given AI model to formulate a respective answer for a particular type of sub-query in the set (e.g., a sub-query that requires summarization, a sub-query that requires knowledge of a given type of named entity, a sub-query that requires analyzing a particular type of digital data object to formulate a respective answer, etc.). The first QA AI agent 208 and second QA AI agent 210 may take various other forms as well.

Turning now to the answer composition AI agent 212, the answer composition AI agent 212 may be preconfigured to interface with a given AI model to compose a final answer to the user query based on the respective answers to the sub-queries. In this respect, the answer composition AI agent 212 may function to receive (i) the user query (i.e., the user query before it was decomposed into the set of sub-queries), and (ii) the respective answers to the sub-queries that are determined by the first QA AI agent 208 and the second QA AI agent 210. The answer composition AI agent 212 may then generate a prompt for the given AI model that comprises a request to compose a final answer to the user query based on the respective answers to the sub-queries. The function of generating the prompt for the given AI model may take various forms.

In one example implementation, the function of generating the prompt may involve transforming the foregoing data received into a prompt that comprises (i) an instruction for the given AI model to formulate a final answer to the user query based on the respective answers to the sub-queries, and perhaps also (ii) additional data that may be utilized by the given AI model when performing the task of formulating the final answer, which may take various forms similar to the additional data included in the prompts generated by the first QA AI agent 208 and/or the second QA AI agent 210.

In line with the discussion above, it should be understood that while the prompt may comprise additional data that may be separate from the instruction for the prompt, in some implementations, the additional data may be included as part of the instruction. Further, the prompt may include other components and may take various other forms, and the function of generating the prompt for the given AI model may take various other forms as well.

After generating the prompt, the answer composition AI agent 212 may provide the prompt to the given AI model, which may in turn function to (i) receive the prompt, (ii) formulate the final answer to the user query based on the respective answers to the sub-queries, and (iii) return the final answer back to the answer composition AI agent 212. In turn, the final answer to the user query may be passed to the output interface 214.

After the output interface 214 receives the final answer to the user query, the output interface 214 may cause the final answer to be presented to the given user via a given client device (e.g., client device 104A, 104B, or 104C of FIG. 1), which may enable the given user to view and/or interact with the final answer to the user query. In practice, this function may involve causing the back-end computing platform 102 to send the final answer to the given client device over a network-based communication path in the form of one or more messages that could be encoded in a format such as HTML, JSON, or the like. In at least some implementations, the one or more messages may be sent via one or more APIs.

Further, in practice, the output interface 214 may cause the final answer to the user query to be presented to the given user in response to the final answer being output by the answer composition AI agent 212 and passed to the output interface 214. It should be understood, however, that the output interface 214 may cause the final answer to the user query to be presented to the given user via the given client device at any of various times, such as in response to certain triggering events (e.g., after receiving a request to access the final answer, etc.), among other possibilities.

The output interface 214 (or some other component of the example software-based pipeline 200) may further be configured to store the final answer to the user query within a data storage layer of the back-end computing platform 102. The output interface 214 (or some other component of the back-end platform 102) may then be able to later access the final answer and cause the s final answer to be presented to the given user.

The example software-based pipeline 200 may include various other components that function to perform operations before the output interface 214 (or some other component of the back-end platform 102) causes the final answer to the user query to be presented to the given user.

Figure 3A:
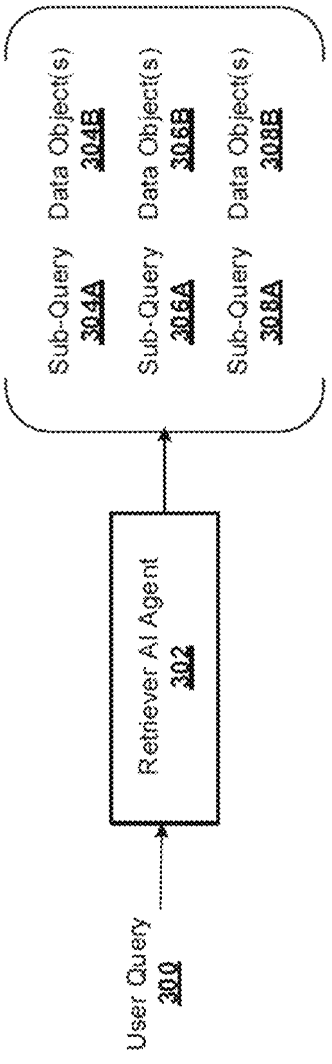
FIG. 3A depicts how an example software-based pipeline for answering questions related to a construction project utilizes an example AI agent to decompose a user query.
Figure 3B:
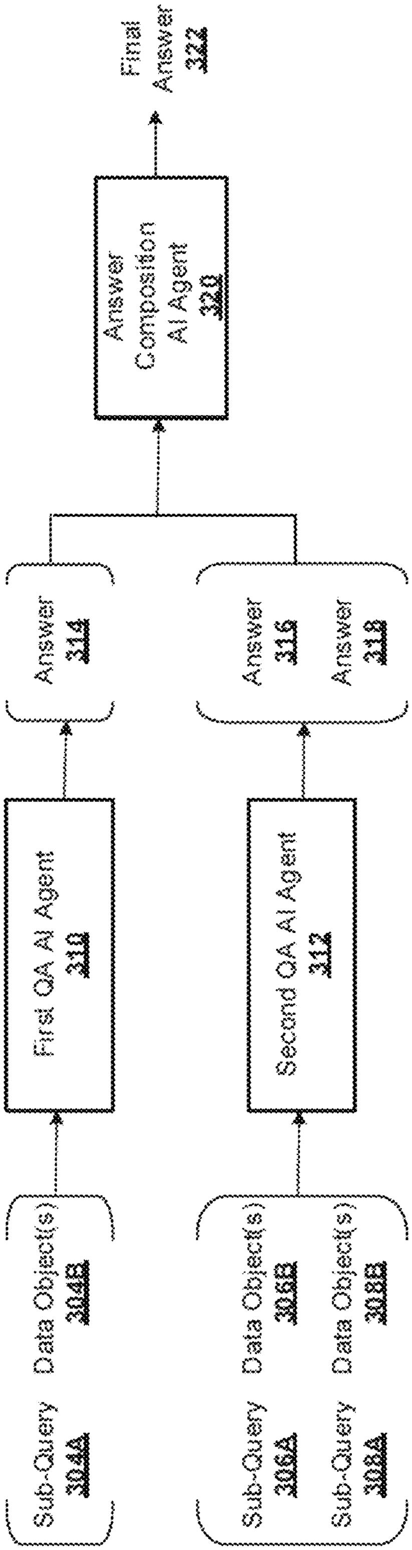
FIG. 3B depicts how an example software-based pipeline for answering questions related to a construction project utilizes example AI agents to formulate an answer to a user query.

Turning now to FIGS. 3A-3B, an example is illustrated that shows how the disclosed software-based pipeline (e.g., example software-based pipeline 200 of FIG. 2) may use the disclosed AI agents to formulate a final answer to an example user query 300. With reference to FIG. 3A, the example user query 300 may be the following question: "Can you provide the status of the electrical system installation, including any RFIs and related drawings?" In line with the discussion above, retriever AI agent 302 (which may take the form similar to retriever AI agent 204) may receive the user query 300 (which may be included in a given prompt as discussed above), and perform various functions.

For instance, the retriever AI agent 302 may be preconfigured to interface with a given AI model to decompose the user query 300 into a set of sub-queries that may include the following three sub-queries: (i) sub-query 304A—"What is the status of the electrical system installation?; (ii) sub-query 306A—"Are there any RFIs related to the electrical system installation?"; (iii) sub-query 308A—"Can you provide the latest drawings of the electrical system installation?"

Further, in line with the discussion above, for each sub-query in the set, the retriever AI agent 302 may function to search and retrieve a respective subset of one or more digital data objects that are relevant to answering the sub-query. For instance, as shown in FIG. 3A, the retriever AI agent 302 may function to search and retrieve (i) digital data object(s) 304B for sub-query 304A, which may include, for example, an installation progress report that discloses the overall progress concerning electrical work for the construction project and an electrical work schedule that may disclose task completion status related to the electrical system installation, (ii) digital data object(s) 306B for sub-query 306A, which may include, for example, one or more RFIs related to the electrical system installation, such as a first RFI (e.g., RFI #12345) that requests information concerning the wiring diagram for an electrical room and a second RFI (e.g., RFI #12346) that requests information concerning circuit breaker specifications, among other possibilities, and (iii) digital data object(s) 308B for sub-query 308A, which may include the latest drawings of the electrical system installation, such as a first drawing (e.g., Drawing #A123) that shows the electrical floor plan for the ground floor, and a second drawing (e.g., Drawing #A124) that shows the electrical schematic for the main distribution panel, among other possibilities.

In turn, for each sub-query in the set, a determination is made (e.g., by a routing logic (not shown) that make take the form similar to the routing logic 206) to either route the sub-query and the respective subset of one or more digital data objects (or information included therein) retrieved for the sub-query to (i) the first QA AI agent 310 or (ii) the second QA AI agent 312. In line with the discussion above, this function may involve determining whether a sub-query requires knowledge of any named entities and then either (i) routing to the first QA AI agent 310 (which may take the form similar to first QA AI agent 208) if the sub-query does not require knowledge of any named entities or (ii) routing to the second QA AI agent 312 (which may take the form similar to second QA AI agent 210) if the sub-query does require knowledge of a named entity.

For instance, the routing logic (not shown) may determine that sub-query 304A (i.e., "What is the status of the electrical system installation?") is a sub-query that does not require knowledge of any named entities and thus, route the sub-query 304A and the respective digital data object(s) 304B (or information included therein) to the first QA AI agent 310. In contrast, the routing logic may determine that sub-query 306A (i.e., "Are there any RFIs related to the electrical system installation?") and sub-query 308A (i.e., "Can you provide the latest drawings of the electrical system installation?") do require knowledge of named entities (e.g., named entities that may be included in RFIs and drawings, respectively) and thus, route the sub-query 306A and the sub-query 308A, along with the respective digital data object(s) 306B and 308B (or information included therein) to the second QA AI agent 312.

In turn, the first QA AI agent 310 may function to answer the sub-query 304A using the respective digital data object (s) 304B (or information included therein) to formulate the following answer 314: "The electrical system installation is currently 60% complete. Major milestones completed include the wiring of the ground floor and partial installation of the main distribution panel. The remaining work is expected to be completed in the next two weeks."

Along similar lines, the second QA AI agent 312 may function to answer the sub-query 306A using the respective digital data object(s) 306B (or information included therein) to formulate the following answer 316:

RFI #12345: "Clarification needed on wiring diagram for electrical room."

RFI #12346: "Question regarding circuit breaker specifications."

Both RFIs are related to the electrical system installation and are currently being reviewed by the project manager.

Further, along similar lines, the second QA AI agent 312 may function to answer the sub-query 308A using the respective digital data object(s) 308B (or information included therein) to formulate the following answer 318:

Drawing #A123: "Electrical Floor Plan for Ground Floor"

Drawing #A124: "Electrical Schematic for Main Distribution Panel"

Both drawings are the latest available versions and show the updated design for the electrical system installation.

In turn, the answer composition AI agent 320 (which may take the form similar to the answer composition AI agent 212) may be preconfigured to interface with a given AI model to compose the final answer 322 to the user query 300 based on the respective answers 314-316 to the sub-queries 304A-308A. For instance, the final answer 322 to the user query 300 may take the following form:

The electrical system installation is currently 60% complete. Major milestones include the wiring of the ground floor and partial installation of the main distribution panel. The remaining work is expected to be completed in the next two weeks.

Additionally, there are two RFIs related to the electrical system installation:

RFI #12345: "Clarification needed on wiring diagram for electrical room."

RFI #12346: "Question regarding circuit breaker specifications."

The latest drawings for the electrical system installation include:

Drawing #A123: "Electrical Floor Plan for Ground Floor"

Drawing #A124: "Electrical Schematic for Main Distribution Panel."

In line with the discussion above, the final answer 322 may be passed to an output interface (which may take the form similar to the output interface 214) to cause the final answer 322 to be presented to a given user.

Figure 4:
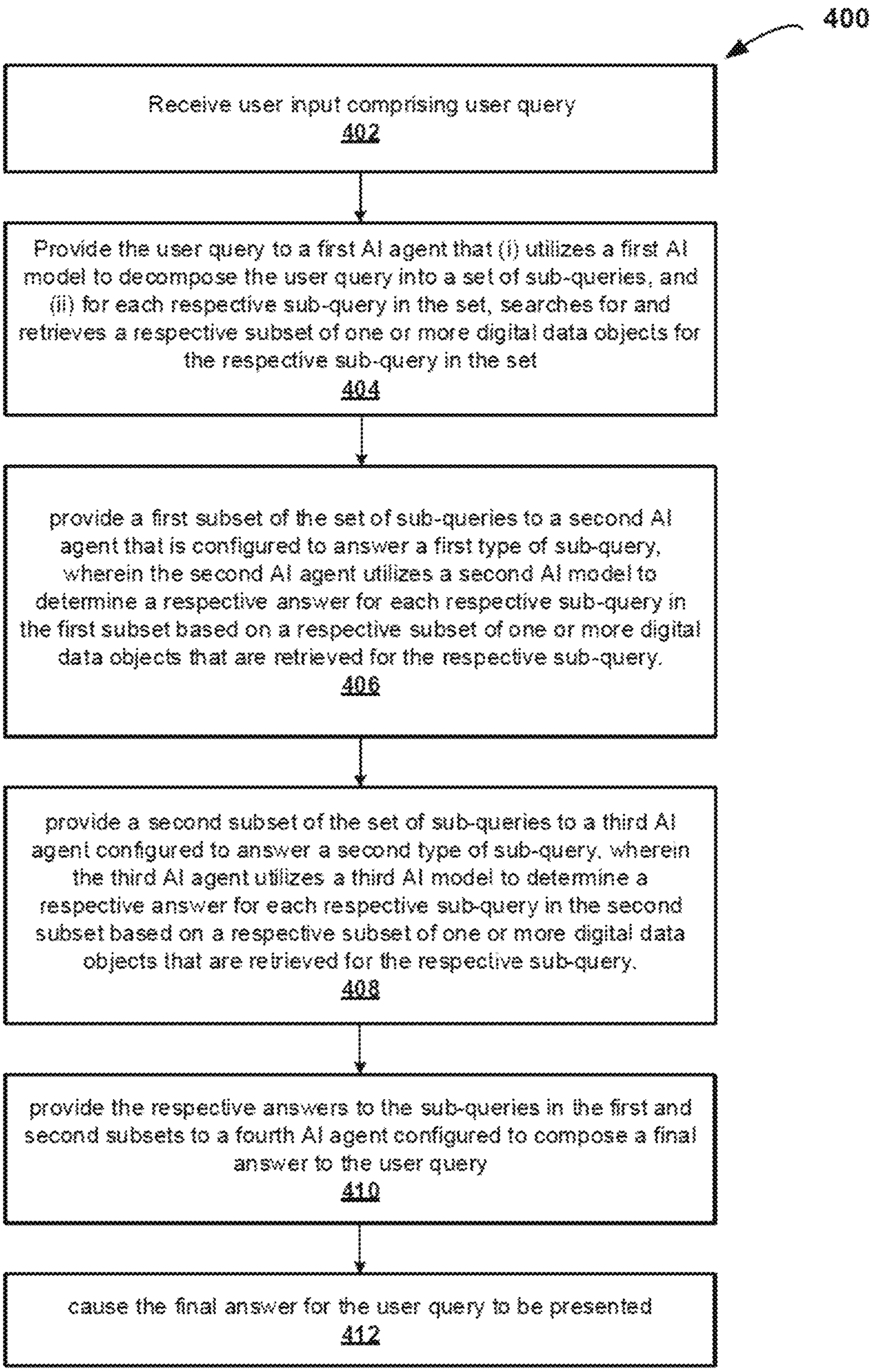
FIG. 4 depicts a flow diagram of an example process that may be carried out in accordance with the disclosed software-based pipeline for generating project-related correspondence.

Turning now to FIG. 4, a flow diagram 400 is depicted showing an example process that may be carried out in accordance with the disclosed software-based pipeline. In practice, the functions of the flow diagram 400 may be carried out by a back-end computing platform (e.g., the back-end computing platform 102 of FIG. 1), but it should be understood that some or all of the functions of flow diagram 400 may be carried out by any one or more computing platforms that are capable of performing such functions. Further, it should be understood that the flow diagram 400 is merely described in this manner for the sake of clarity and explanation and that the example functions described may be implemented in various other manners, including the possibility that functions may be added, removed, rearranged into different orders, combined into fewer blocks, and/or separated into additional blocks depending upon the particular embodiment.

Starting at block 402, the disclosed software-based pipeline may receive user input that comprises a user query concerning a given construction project. In line with the previous discussion with respect to the example software-based pipeline 200, the user input that is received and user query may take various forms, and the user input may be initiated at any of various times.

At block 404, the disclosed software-based pipeline may provide the user query to a first artificial intelligence (AI) agent (e.g., the retriever AI agent 204) that (i) utilizes a first AI model to decompose the user query into a set of sub-queries, and (ii) for each respective sub-query in the set, searches for and retrieves a respective subset of one or more digital data objects for the respective sub-query in the set. In line with the discussion above with respect to the retriever AI agent 204, the foregoing functions may take various forms.

At block 406, the disclosed software-based pipeline may then provide a first subset of the set of sub-queries to a second AI agent (e.g., the first QA AI agent 208) that is configured to answer a first type of sub-query (e.g., sub-queries that do not require knowledge of named entities), wherein the second AI agent utilizes a second AI model to determine a respective answer for each respective sub-query in the first subset based on a respective subset of one or more digital data objects that are retrieved for the respective sub-query.

At block 408, the disclosed software-based pipeline may provide a second subset of the set of sub-queries to a third AI agent (e.g., the second QA AI agent 210) that is configured to answer a second type of sub-query (e.g., sub-queries that do require knowledge of named entities), wherein the third AI agent utilizes a third AI model to determine a respective answer for each respective sub-query in the second subset based on a respective subset of one or more digital data objects that are retrieved for the respective sub-query.

In line with the discussion above, the disclosed software-based pipeline may determine to route the first subset of the sub-queries to the second AI agent and determine to route the second subset of the sub-queries to the third AI agent based on determining that the first subset of the sub-queries do not require knowledge of any named entities, and the second subset of the sub-queries do require knowledge of named entities.

In turn, at block 410, the disclosed software-based pipeline may provide the respective answers to the sub-queries in the first and second subsets to a fourth AI agent (e.g., the answer composition AI agent 212) that is configured to compose a final answer to the user query.

At block 412, the disclosed software-based pipeline may the cause the final answer for the user query to be presented. In line with the discussion above, the disclosed software-based pipeline may the cause the final answer for the user query to be presented at various times.

Figure 5:
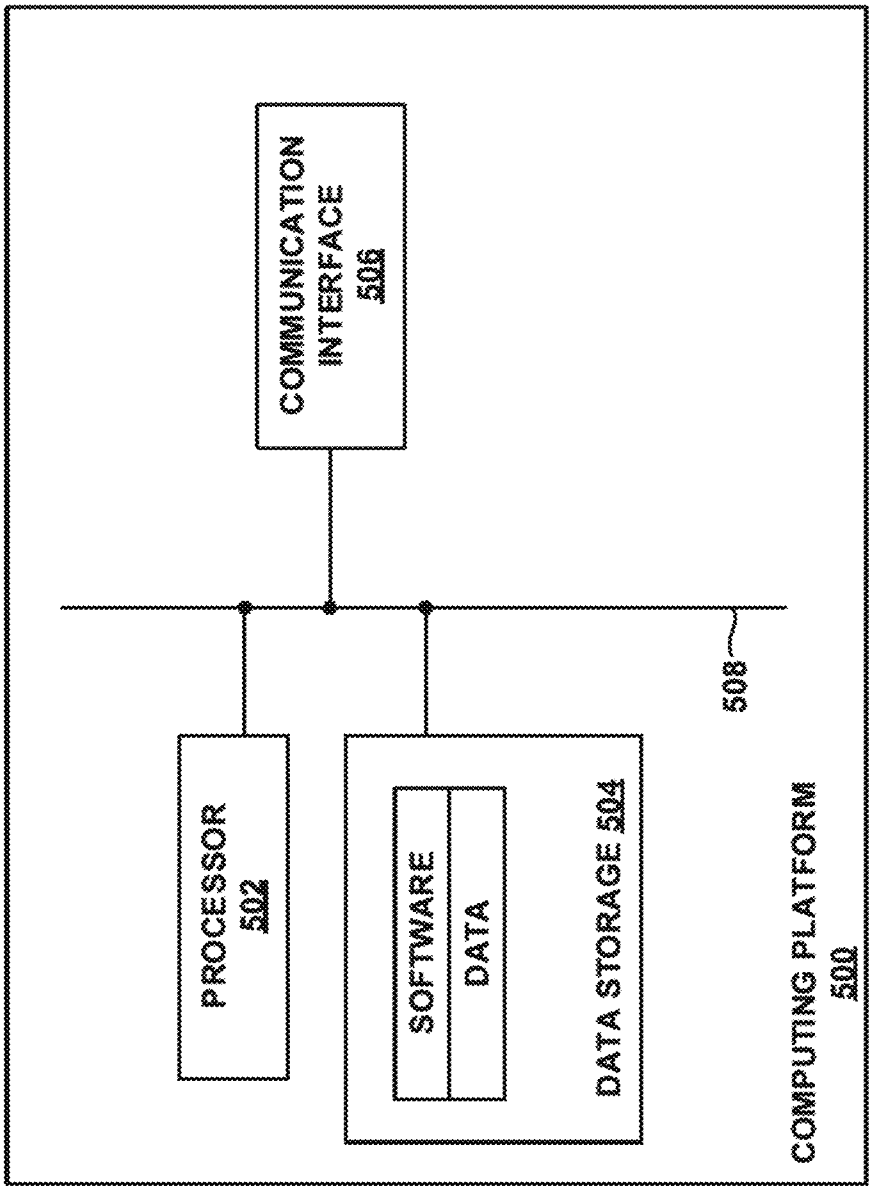
FIG. 5 depicts an example computing platform that may be configured to carry out one or more of the functions of the present disclosure.

Turning now to FIG. 5, a simplified block diagram is provided to illustrate some structural components that may be included in an example computing platform 500 that may be configured to perform the platform-side functions disclosed herein. At a high level, the example computing platform 500 may generally comprise any one or more computer systems (e.g., one or more servers) that collectively include one or more processors 502, data storage 504, and one or more communication interfaces 506, each of which may be communicatively linked by a communication link 508 that may take the form of a system bus, a communication network such as a public, private, or hybrid cloud, or some other connection mechanism. Each of these components may take various forms.

For instance, the one or more processors 502 may comprise one or more processor components, such as one or more central processing units (CPUs), graphics processing units (GPUs), application-specific integrated circuits (ASICs), digital signal processor (DSPs), and/or programmable logic devices such as field programmable gate arrays (FPGAs), among other possible types of processing components. In line with the discussion above, it should also be understood that the one or more processors 502 could comprise processing components that are distributed across a plurality of physical computing devices connected via a network, such as a computing cluster of a public, private, or hybrid cloud.

In turn, the data storage 504 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that the data storage 504 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 5, the data storage 504 may be capable of storing both (i) program instructions that are executable by the one or more processors 502 such that the example computing platform 500 is configured to perform any of the various functions disclosed herein (including but not limited to any of the platform-side functions discussed above), and (ii) data that may be received, derived, or otherwise stored by the example computing platform 500.

The one or more communication interfaces 506 may comprise one or more interfaces that facilitate communication between the example computing platform 500 and other systems or devices, where each such interface may be wired and/or wireless and may communicate according to any of various communication protocols. As examples, the one or more communication interfaces 506 may take include an Ethernet interface, a serial bus interface (e.g., Firewire, USB 3.0, etc.), a chipset and antenna adapted to facilitate any of various types of wireless communication (e.g., Wi-Fi communication, cellular communication, Bluetooth® communication, etc.), and/or any other interface that provides for wireless or wired communication. Other configurations are possible as well.

Although not shown, the example computing platform 500 may additionally have an Input/Output (I/O) interface that includes or provides connectivity to I/O components that facilitate user interaction with the example computing platform 500, such as a keyboard, a mouse, a trackpad, a display screen, a touch-sensitive interface, a stylus, a virtual-reality headset, and/or one or more speaker components, among other possibilities.

It should be understood that the example computing platform 500 is one example of a computing platform that may be used with the examples described herein. Numerous other arrangements are possible and contemplated herein. For instance, in other examples, the example computing platform 500 may include additional components not pictured and/or more or less of the pictured components.

Figure 6:
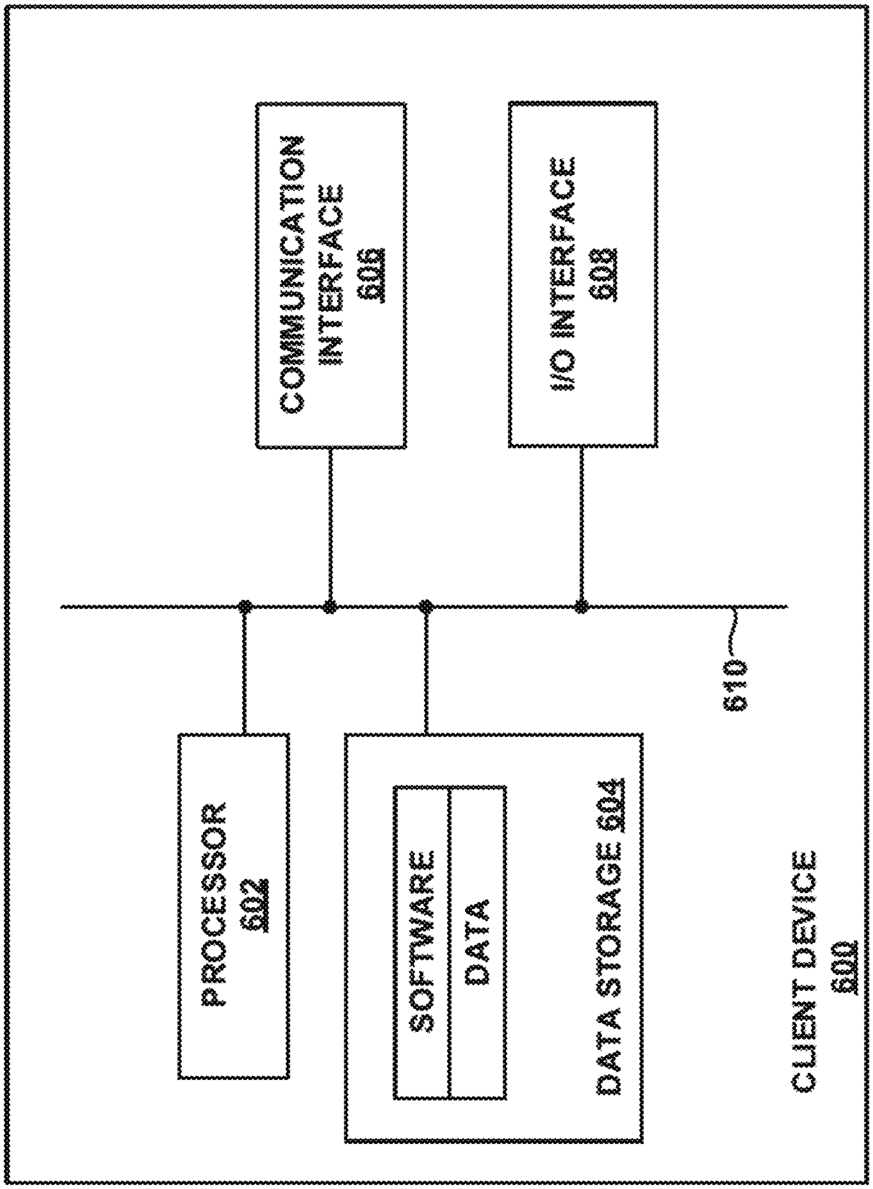
FIG. 6 depicts an example client device that may be configured to carry out one or more of the functions of the present disclosure.

Turning next to FIG. 6, a simplified block diagram is provided to illustrate some structural components that may be included in an example client device 600 that may be configured to perform some the client-side functions disclosed herein. At a high level, the example client device 600 may include one or more processors 602, data storage 604, one or more communication interfaces 606, and an I/O interface 608, each of which may be communicatively linked by a communication link 610 that may take the form a system bus and/or some other connection mechanism. Each of these components may take various forms.

For instance, the one or more processors 602 of the example client device 600 may comprise one or more processor components, such as one or more CPUs, GPUs, ASICs, DSPs, and/or programmable logic devices such as FPGAs, among other possible types of processing components.

In turn, the data storage 604 of the example client device 600 may comprise one or more non-transitory computer-readable mediums, examples of which may include volatile storage mediums such as random-access memory, registers, cache, etc. and non-volatile storage mediums such as read-only memory, a hard-disk drive, a solid-state drive, flash memory, an optical-storage device, etc. As shown in FIG. 6, the data storage 604 may be capable of storing both (i) program instructions that are executable by the one or more processors 602 of the example client device 600 such that the example client device 600 is configured to perform any of the various functions disclosed herein (including but not limited to any of the client-side functions discussed above), and (ii) data that may be received, derived, or otherwise stored by the example client device 600.

The one or more communication interfaces 606 may comprise one or more interfaces that facilitate communication between the example client device 600 and other systems or devices, where each such interface may be wired and/or wireless and may communicate according to any of various communication protocols. As examples, the one or more communication interfaces 606 may take include an Ethernet interface, a serial bus interface (e.g., Firewire, USB 3.0, etc.), a chipset and antenna adapted to facilitate any of various types of wireless communication (e.g., Wi-Fi communication, cellular communication, Bluetooth® communication, etc.), and/or any other interface that provides for wireless or wired communication. Other configurations are possible as well.

The I/O interface 608 may generally take the form of (i) one or more input interfaces that are configured to receive and/or capture information at the example client device 600 and (ii) one or more output interfaces that are configured to output information from the example client device 600 (e.g., for presentation to a user). In this respect, the one or more input interfaces of I/O interface may include or provide connectivity to input components such as a microphone, a camera, a keyboard, a mouse, a trackpad, a touchscreen, and/or a stylus, among other possibilities, and the one or more output interfaces of the I/O interface 608 may include or provide connectivity to output components such as a display screen and/or an audio speaker, among other possibilities.

It should be understood that the example client device 600 is one example of a client device that may be used with the examples described herein. Numerous other arrangements are possible and contemplated herein. For instance, in other examples, the example client device 600 may include additional components not pictured and/or more or fewer of the pictured components.

IV. CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users," or other entities, this is for purposes of example and explanation only. The claims should not be construed as requiring action by such actors unless explicitly recited in the claim language.

What is claimed is:

1. A computing platform comprising:

at least one processor;

at least one non-transitory computer-readable medium; and program instructions stored on the at least one non-transitory computer-readable medium that, when executed by the at least one processor, cause the computing platform to:

receive a user query related to a construction project;

provide the user query to a first artificial intelligence (AI) agent that (i) utilizes a first AI model to decompose the user query into a set of sub-queries, and (ii) for each respective sub-query in the set, searches for and retrieves a respective subset of one or more digital data objects for the respective sub-query in the set;

evaluate whether the set of sub-queries rely on knowledge of named entities and thereby identify (i) a first subset of the set of sub-queries that do not rely on knowledge of named entities and (ii) a second subset of the set of sub-queries that do rely on knowledge of named entities;

provide the first subset of the set of sub-queries to a second AI agent that is configured to answer sub-queries that do not rely on knowledge of named entities, wherein the second AI agent utilizes a second AI model to determine a respective answer for each respective sub-query in the first subset based on a respective subset of one or more digital data objects that are retrieved for the respective sub-query;

provide the second subset of the set of sub-queries to a third AI agent that is configured to answer sub-queries that do rely on knowledge of named entities, wherein the third AI agent utilizes a third AI model to determine a respective answer for each respective sub-query in the second subset based on a respective subset of one or more digital data objects that are retrieved for the respective sub-query;

provide the respective answers to the sub-queries in the first and second subsets to a fourth AI agent that is configured to compose a final answer to the user query; and cause the final answer for the user query to be presented.

2. The computing platform of claim 1, wherein the program instructions that, when executed by the at least one processor, cause the computing platform to evaluate whether the set of sub-queries rely on knowledge of named entities and thereby identify (i) the first subset of the set of sub-queries that do not rely on knowledge of named entities and (ii) the second subset of the set of sub-queries that do rely on knowledge of named entities comprise program instructions stored on the at least one non-transitory computer-readable medium that, when executed by the at least one processor, cause the computing platform to:

for each respective sub-query in the set, determine whether the respective sub-query relies on knowledge of named entities and then include the respective sub-query in either (i) the first subset if the respective sub-query does not rely on knowledge of named entities or (ii) the second subset if the respective sub-query does rely on knowledge of named entities.

3. The computing platform of claim 1, wherein the named entities comprise one or more of names of individuals, names of parties, locations, addresses, events, or types of digital data objects.

4. The computing platform of claim 1, wherein each respective subset of one or more digital data objects comprises one or more schedules, daily logs, images, drawings, specifications, correspondence, building information models (BIMs), sensor data, budgets, change orders, communications, invoices, directories, punch lists, timesheets, requests for information (RFIs), submittals, or reports.

5. The computing platform of claim 1, wherein the first AI agent decomposes the user query into the set of sub-queries using a chain-of-thought reasoning technique.

6. The computing platform of claim 1, wherein the first AI agent searches for the respective subset of one or more digital data objects for each respective sub-query in the set using a semantic search technique.

7. The computing platform of claim 1, wherein the second AI model comprises a pre-trained generative AI model and the third AI model comprises a fine-tuned generative AI model.

8. A non-transitory computer-readable medium, wherein the non-transitory computer-readable medium is provisioned with program instructions that, when executed by at least one processor, cause a computing platform to:

receive a user query related to a construction project;

provide the user query to a first artificial intelligence (AI) agent that (i) utilizes a first AI model to decompose the user query into a set of sub-queries, and (ii) for each respective sub-query in the set, searches for and retrieves a respective subset of one or more digital data objects for the respective sub-query in the set;

evaluate whether the set of sub-queries rely on knowledge of named entities and thereby identify (i) a first subset of the set of sub-queries that do not rely on knowledge of named entities and (ii) a second subset of the set of sub-queries that do rely on knowledge of named entities;

provide the first subset of the set of sub-queries to a second AI agent that is configured to answer sub-queries that do not rely on knowledge of named entities, wherein the second AI agent utilizes a second AI model to determine a respective answer for each respective sub-query in the first subset based on a respective subset of one or more digital data objects that are retrieved for the respective sub-query;

provide the second subset of the set of sub-queries to a third AI agent that is configured to answer sub-queries that do rely on knowledge of named entities, wherein the third AI agent utilizes a third AI model to determine a respective answer for each respective sub-query in the second subset based on a respective subset of one or more digital data objects that are retrieved for the respective sub-query;

provide the respective answers to the sub-queries in the first and second subsets to a fourth AI agent that is configured to compose a final answer to the user query; and cause the final answer for the user query to be presented.

9. The non-transitory computer-readable medium of claim 8, wherein the program instructions that, when executed by the at least one processor, cause the computing platform to evaluate whether the set of sub-queries rely on knowledge of named entities and thereby identify (i) the first subset of the set of sub-queries that do not rely on knowledge of named entities and (ii) the second subset of the set of sub-queries that do rely on knowledge of named entities comprise program instructions that, when executed by the at least one processor, cause the computing platform to:

for each respective sub-query in the set, determine whether the respective sub-query relies on knowledge of named entities and then include the respective sub-query in either (i) the first subset if the respective sub-query does not rely on knowledge of named entities or (ii) the second subset if the respective sub-query does rely on knowledge of named entities.

10. The non-transitory computer-readable medium of claim 8, wherein the named entities comprise one or more of names of individuals, names of parties, locations, addresses, events, or types of digital data objects.

11. The non-transitory computer-readable medium of claim 8, wherein each respective subset of one or more digital data objects comprises one or more schedules, daily logs, images, drawings, specifications, correspondence, building information models (BIMs), sensor data, budgets, change orders, communications, invoices, directories, punch lists, timesheets, requests for information (RFIs), submittals, or reports.

12. The non-transitory computer-readable medium of claim 8, wherein the first AI agent decomposes the user query into the set of sub-queries using a chain-of-thought reasoning technique.

13. A method carried out by a computing platform, the method comprising:

receiving a user query related to a construction project;

providing the user query to a first artificial intelligence (AI) agent that (i) utilizes a first AI model to decompose the user query into a set of sub-queries, and (ii) for each respective sub-query in the set, searches for and retrieves a respective subset of one or more digital data objects for the respective sub-query in the set;

evaluating whether the set of sub-queries rely on knowledge of named entities and thereby identifying (i) a first subset of the set of sub-queries that do not rely on knowledge of named entities and (ii) a second subset of the set of sub-queries that do rely on knowledge of named entities;

providing the first subset of the set of sub-queries to a second AI agent that is configured to answer sub-queries that do not rely on knowledge of named entities, wherein the second AI agent utilizes a second AI model to determine a respective answer for each respective sub-query in the first subset based on a respective subset of one or more digital data objects that are retrieved for the respective sub-query;

providing the second subset of the set of sub-queries to a third AI agent that is configured to answer sub-queries that do rely on knowledge of named entities, wherein the third AI agent utilizes a third AI model to determine a respective answer for each respective sub-query in the second subset based on a respective subset of one or more digital data objects that are retrieved for the respective sub-query;

providing the respective answers to the sub-queries in the first and second subsets to a fourth AI agent that is configured to compose a final answer to the user query; and causing the final answer for the user query to be presented.

14. The method of claim 13, wherein evaluating whether the set of sub-queries rely on knowledge of named entities and thereby identifying (i) the first subset of the set of sub-queries that do not rely on knowledge of named entities and (ii) the second subset of the set of sub-queries that do rely on knowledge of named entities comprises:

for each respective sub-query in the set, determining whether the respective sub-query relies on knowledge of named entities and then including the respective sub-query in either (i) the first subset if the respective sub-query does not rely on knowledge of named entities or (ii) the second subset if the respective sub-query does rely on knowledge of named entities.

15. The computing platform of claim 1, wherein the program instructions that, when executed by the at least one processor, cause the computing platform to evaluate whether the set of sub-queries rely on knowledge of named entities comprise program instructions stored on the at least one non-transitory computer-readable medium that, when executed by the at least one processor, cause the computing platform to:

evaluate whether the set of sub-queries rely on knowledge of named entities related to the construction project.

16. The non-transitory computer-readable medium of claim 8, wherein the program instructions that, when executed by the at least one processor, cause the computing platform to evaluate whether the set of sub-queries rely on knowledge of named entities comprise program instructions that, when executed by the at least one processor, cause the computing platform to:

evaluate whether the set of sub-queries rely on knowledge of named entities related to the construction project.

17. The method of claim 13, wherein the named entities comprise one or more of names of individuals, names of parties, locations, addresses, events, or types of digital data objects.

18. The method of claim 13, wherein each respective subset of one or more digital data objects comprises one or more schedules, daily logs, images, drawings, specifications, correspondence, building information models (BIMs), sensor data, budgets, change orders, communications, invoices, directories, punch lists, timesheets, requests for information (RFIs), submittals, or reports.

19. The method of claim 13, wherein the second AI model comprises a pre-trained generative AI model and the third AI model comprises a fine-tuned generative AI model.

20. The method of claim 13, wherein evaluating whether the set of sub-queries rely on knowledge of named entities comprises:

evaluating whether the set of sub-queries rely on knowledge of named entities related to the construction project.

* * * * *